United States Patent Office 2,894,088
Patented July 7, 1959

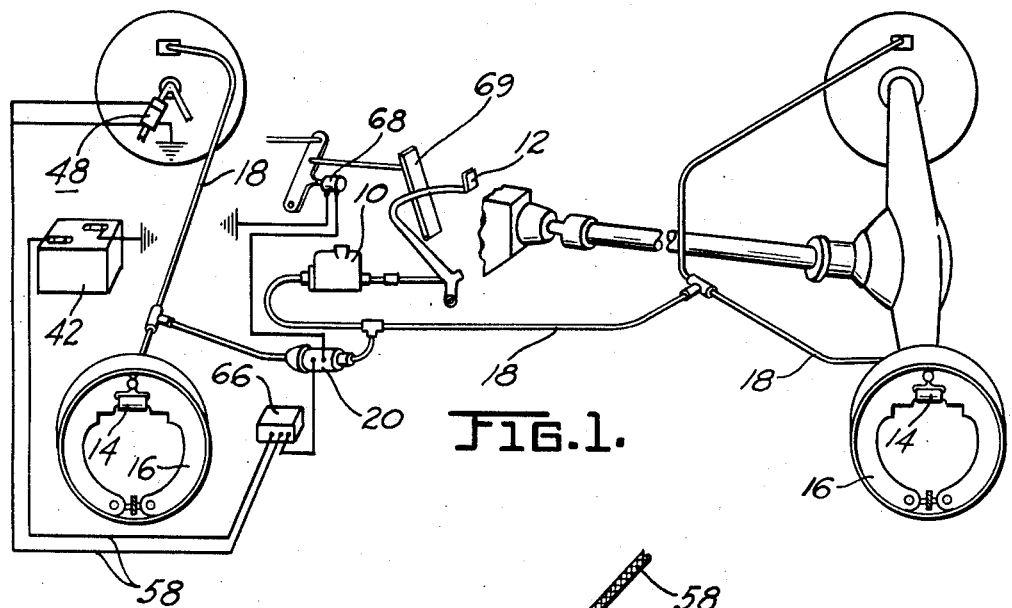
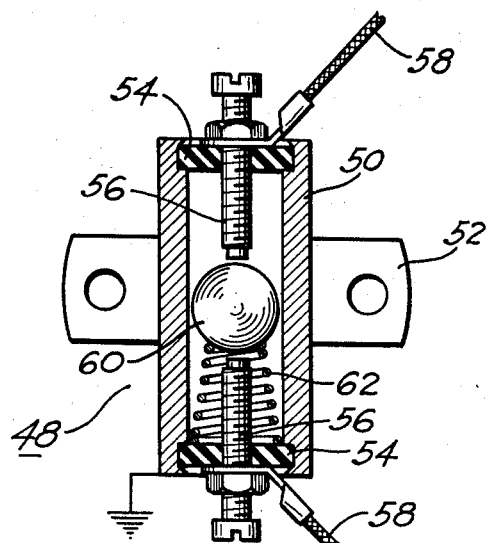
INVENTOR.
EDWIN E. PRATHER.
BY H. O. Clayton
ATTORNEY

2,894,088
SWITCH MECHANISM

Edwin Eugene Prather, South Bend, Ind., assignor to Bendix Aviation Corporation, South Bend, Ind., a corporation of Delaware Original application March 1, 1954, Serial No. 413,042. Divided and this application November 10, 1955, Serial No. 546,201

2 Claims. (Cl. 200—61.45)

This invention relates in general to switch means and more particularly to an inertia type of switch adapted to be incorporated in the brake control mechanism of an automotive vehicle.

This application is a division of my copending application Serial No. 413,042 for "Switch Mechanism," filed March 1, 1954, and all subject matter contained in said copending application which is applicable to the disclosure thereof that corresponds with the disclosure of the present application is made a part hereof by reference.

In certain arts, for example, any one of the automotive brake control arts or the stamping press arts, it is desirable to control the time of operation of a brake mechanism in its operation of either maintaining a certain mass static after said mass is brought to a stop or its operation of bringing said mass to a stop in which case the brake mechanism is applied while the mass is still in motion. It is accordingly an object of my invention to effect this end and this may be done by the provision of a simple, compact and easily serviced switch controlling electrical means which may include a relay, said switch controlling means being included as a part of the relay and a part of the means being controlled, i.e., an anti-creep mechanism of the brake system of an automotive vehicle. With this adaptation of my invention, including the inertia switch constituting the essence of my invention, there is provided means insuring an operation of the anti-creep mechanism either before or after the vehicle comes to a stop depending upon the adjustment of the mechanism.

Another object of my invention is to improve upon the governor controlled switch mechanisms of the day. Such mechanisms, i.e., the cubicle fly ball governor type of mechanism, are costly and have proven ineffective in operation when the same are used to control parts of the power plant of an automotive vehicle. Particularly is this true when this type of governor switch mechanism is called upon as a control at low vehicle speeds or to function after the vehicle is brought to a stop. However, with the mechanism disclosed in this application, the inertia switch constituting my invention is certain of operaton either at the beginning of a certain period of time before the vehicle is stopped or at the end of a certain period of time after the vehicle is brought to a stop, the particular operation depending upon the adjustment of the mechanism.

Yet another object of my invention is to provide a switch controlling mechanism controlled by an inertia operated ball type switch, such that the switch to be controlled may be operated either before the inertia operated switch ceases to operate or at a certain time after said switch ceases to operate.

A further object of my invention is to provide, in a mechanism having a prime mover for placing all or certain parts of the mechanism in motion, a brake structure for bringing all or certain parts of said mechanism to a stop, said brake structure including the switch means which constitutes my invention, said switch being operative in accordance with the kinetic energy of certain parts of the mechanism and being unaffected in its operation by the operation of the prime mover.

A further object of my invention is to provide, in combination with a part of the unsprung portion of an automotive vehicle such as the A frame thereof, an inertia operated switch mounted on said frame, said switch, constituting my invention, serving as part of the brake anti-creep mechanism of the vehicle.

The essence of my invention lies in the provision of a simple and compact inertia operated switch mechanism adapted for use in the controls of an automotive vehicle.

The above and other objects and features of the invention will appear more fully hereinafter from a consideration of the following description taken in connection with the accompanying drawings where one embodiment of the invention is illustrated by way of example.

Figure 1 is a diagrammatic view disclosing the switch constituting my invention, being employed as a part of the anti-creep mechanism of an automotive vehicle; and Figure 2 is a sectional view disclosing details of the inertia switch mechanism constituting my invention.

There is disclosed in Figures 1 and 2 a preferred embodiment of my invention wherein a switch controlling mechanism, including the inertia switch constituting my invention, is employed to control a well known type of brake mechanism of an automotive vehicle, said mechanism including an anti-creep mechanism. This brake and anti-creep mechanism includes a master cylinder 10 housing a piston, not shown, which is actuated as a result of the manual operation of a brake pedal 12. Depression of the brake pedal to apply the brakes energizes wheel cylinders 14 which in turn actuate the brake shoes 16 of the wheel brakes of the vehicle. In this operation an incompressible or substantially incompressible brake fluid flows through conduits 18 and upon release of the brake pedal a certain mechanism including return springs, not shown, operates to return the parts of the mechanism to their brake off positions.

Briefly describing the anti-creep mechanism of this brake mechanism a solenoid operated check valve 20 preferably inserted in the system to control the front brakes of the vehicle, operates, with a release of the brake pedal and after the energization of a grounded solenoid, not shown, to trap the brake fluid between the wheel cylinders and said valve, thereby holding the brakes in their applied position; however, said solenoid when de-energized serves to disable this valve and thereby disable the anti-creep mechanism. No claim is made to the solenoid operated check valve which may be of any suitable type.

In certain cars of the day the solenoid of the unit 20 is energized and de-energized, to operate the anti-creep portion of the brake mechanism, with an operation of a vehicle speed responsive governor operated switch; however, as stated above in the objects of my invention, this governor is somewhat uncertain in operation particularly as to its time of operation. Accordingly, it is an object of my invention to provide an efficient and effective means for controlling the time of operation of a switch mechanism and said control means, including the switch constituting my invention, may, as disclosed in Figure 1, be substituted for the aforementioned vehicle speed responsive governor operated control switch of the anti-creep mechanism of the day.

Describing now the switch control means of Figure 1, there is provided, in a unit 66, a normally closed switch of a relay; and this switch is preferably biased to its closed position by a spring. The coil of the relay is electrically connected in series with a grounded battery 42 and a grounded ball type inertia breaker switch 48 which is opened just before the car is brought to a stop; and said switch, which constitutes my invention, is open-when the car is at a stop. The latter switch is disclosed in detail in Figure 2.

As disclosed in Figure 2 the inertia switch 48, which is preferably mounted on an unsprung portion of the vehicle, preferably the A frame thereof, includes an electrically grounded tubular metal casing 50 secured to said frame by a bracket member 52 fixedly secured to the casing. The ends of the tube are closed by insulating mats 54 each having an opening in its central portion to adjustably receive electrical contact screws 56. The screws, which are conductors of electricity, have electrical conductor wires 58 secured thereto. The screws are spaced from each other at the center of the tube and a metallic, electrically conductive ball 60, supported by a spring 62 in tight contact with the tube, is positioned in this space. When the vehicle is at a standstill the ball 60 is spaced from the ends of the screws 56, all as disclosed in Figure 2.

As to the operation of the switch 48 when the vehicle is traveling say at a speed of over one mile per hour the movement, including the up and down movement, of the contact screws 56 is such that the switch is closed. Describing this operation the ball 60, by virtue of its inertia, tends to remain at rest accordingly when the casing 50 and the contact screws 56 secured thereto are sufficiently accelerated either up or down, the ball will come into contact with one or the other of said screws thereby closing the switch. In this operation it is to be remembered that the metallic casing 50 is electrically grounded and that the spring 62, ball 60 and insulated screws 56 are conductors of electricity. It is to be particularly noted that the switch 48 is so constructed and so mounted on the vehicle that the same is not closed by the vibration caused by the idling engine that is prime mover of the vehicle, the latter being then at a standstill.

One feature of the control unit 66 lies in the provision of a condenser, not shown, which is electrically connected in parallel with the relay coil in the aforementioned electrical circuit including the battery 42 and the inertia breaker switch 48 constituting my invention. The relay, including switch and coil together with the condenser, combine to make up the unit 66, no claim to which is made.

The parts of the mechanism of Figure 1, particularly the switch 48 and the condenser, are preferably so constructed and arranged and so operative that the anti-creep mechanism is rendered operative at the beginning of a certain period of time before the vehicle comes to a stop, say when the vehicle is traveling at the rate of one mile per hour; or the parts of the mechanism may be constructed and arranged and operative to effect an operation of the anti-creep mechanism at the end of a certain period of time after the vehicle comes to a stop. An inspection of the electrical hookup of Figure 1 and an inspection of the switch mechanism 48 of Figure 2 reveals the operation of the mechanism to effect either one of these results inasmuch as the condenser of the unit 66 is electrically connected in parallel with the relay coil. It is to be particularly noted that the time of operation, that is time of opening of the switch 48, is controlled in large measure by the kinetic energy of the vehicle as a means for effecting the operation of said switch. With normal driving on the roads of the day the switch 48 will be closed when the car is traveling over one mile per hour.

As to the remainder of the electrical circuit for controlling the solenoid of the check valve 20 said circuit includes, in series with the solenoid, the normally open relay switch of the unit 66, an accelerator operated breaker switch 68, and the grounded battery 42. The accelerator operated breaker switch 68 is not disclosed in detail inasmuch as no claim is made thereto the same being of any of the well known designs of such a switch. This switch 68 is closed only when the accelerator is in its released position the latter being indicated by the reference numeral 69.

Describing now in brief the operation of the mechanism disclosed in the figures of the drawing the anti-creep mechanism is rendered inoperative so long as the car is traveling at a speed of above say one mile per hour; this for the reason that the relay switch of the unit 66 is then held open by a closure operation of the inertia switch 48 and the operation of the condenser of said unit, thereby rendering the check valve 20 inoperative to trap the brake fluid in the slave cylinders. However, at the end of a certain period of time after the car reaches the aforementioned reduced speed, that is the time period in micro seconds during which the condenser is in its process of discharging, the relay switch is automatically closed by operation of the relay switch spring thereby effecting an energization of the solenoid of the unit 20 to render the anti-creep mechanism operative. It is repeated, however, that the mechanism of Figures 1 and 2 may be adjusted to effect the initiation of the operation of the anti-creep mechanism at the beginning of a certain period of time after the car comes to a stop.

The time of operation of the anti-creep mechanism with respect to movement of the vehicle, that is the determination of whether or not the anti-creep mechanism comes into play before or after the car comes to a stop and when this operation is effected, may be controlled by a determination of any one or a plurality of many factors including the capacity of the condenser, the air gap of the relay, the resistance of the relay coil, the strength of the relay spring, and the speed of operation of the breaker switch 48.

The relay switch, that is the switch which is controlled, may also be employed to control the closure of the doors of an automotive bus and to control the operation of a transmission operating mechanism of an automotive vehicle to effect say a low gear setting of said mechanism; and to effect the latter operation of my invention the parts of the mechanism are preferably so constructed as to effect a closure of the said switch a short time prior to a stopping of the vehicle.

The switch control means disclosed in Figure 1 also finds a place when used in an automotive vehicle including a fluid coupling combined with the above described hydraulic anti-creep brake mechanism; and said switch control means may also be incorporated in the brake mechanism of a stamping press wherein it is desirable to employ a small and inexpensive brake to maintain a relatively massive fly wheel or equivalent part of the press mechanism static. With the mechanism disclosed in Figure 1 the brake may be applied and held applied to the prime mover driven fly wheel of the stamping press after and only after said fly wheel has come to a stop; or the parts may be constructed and adjusted so that the brake is applied and held applied just before the fly wheel comes to a stop.

The inertia operated switch mechanism constituting the invention of this application is well suited for use in a mechanism requiring a switch operative in accordance with its mode of bodily movement such as the mechanism disclosed in said application; for such an easily serviced switch, with its relatively few parts, is sensitive in operation being responsive to either a relatively low deceleration or a relatively low acceleration of the ball member 60 or its equivalent. The inertia switch 48 constituting my invention might also be employed as a part of the control means of a washing machine of the spin dry type; so that if the load of said machine caused the machine to excessively vibrate then the control would immediately function to stop the operation of the machine.

Although only one embodiment of the invention has been illustrated and described, various changes in the

I claim:

1. A ball type inertia switch mechanism comprising a tubular shaped casing member, an insulator member mounted in each end of the casing member, two cylindrically shaped switch contact members, one mounted in the insulator member in one end of the casing member and extending lengthwise of said member and the other mounted in the insulator member at the other end of the casing member and also extending lengthwise of said member, an electrically conductive yieldable member housed within the casing and encircling one of the switch contact members, a ball contact member adapted to seat on the yieldable member, biased by the yieldable member to a position between the two switch contact members and spaced from said members, and adapted, with a bodily reciprocatory movement of the casing, to successively momentarily contact the two switch contact members.

2. A ball type inertia switch mechanism comprising a tubular shaped casing member, an insulator member mounted in each end of the casing member, two cylindrically shaped switch contact members, one mounted in the insulator member in one end of the casing member and extending lengthwise of said member and the other mounted in the insulator member at the other end of the casing member and also extending lengthwise of said member, a cone shaped electrically conductive spring member housed within the casing and encircling one of the switch contact members, a ball contact member adapted to seat on the spring, biased by the spring member to a position between the two switch contact members and spaced from said members, and adapted, with a bodily reciprocatory movement of the casing, to successively momentarily contact the two switch contact members.

References Cited in the file of this patent

UNITED STATES PATENTS

| | | |
|---|---|---|
| 1,107,245 | Bard | Aug. 18, 1914 |
| 1,611,219 | Minninger | Dec. 21, 1926 |
| 1,845,848 | Richards | Feb. 16, 1932 |
| 2,475,728 | Smith | July 12, 1949 |

FOREIGN PATENTS

| | | |
|---|---|---|
| 768,775 | France | May 28, 1934 |